US010828930B2

(12) United States Patent
Hermann et al.

(10) Patent No.: US 10,828,930 B2
(45) Date of Patent: Nov. 10, 2020

(54) COMPOSITE BODY MADE OF FIBRE-COMPOSITE MATERIAL AND A DECORATIVE ELEMENT

(71) Applicant: D. Swarovski KG, Wattens (AT)

(72) Inventors: Walter Hermann, Terfens (AT); Robin Kunstl, Fritzens (AT); Markus Santer, Innsbruck (AT)

(73) Assignee: D. Swarovski KG, Wattens (AT)

( * ) Notice: Subject to any disclaimer, the term of this patent is extended or adjusted under 35 U.S.C. 154(b) by 618 days.

(21) Appl. No.: 15/340,156

(22) Filed: Nov. 1, 2016

(65) Prior Publication Data

US 2017/0043613 A1 Feb. 16, 2017

Related U.S. Application Data

(63) Continuation of application No. PCT/EP2015/059652, filed on May 4, 2015.

(30) Foreign Application Priority Data

May 5, 2014 (EP) ..................................... 14001564

(51) Int. Cl.
| | | |
|---|---|---|
| B32B 27/12 | (2006.01) | |
| B32B 5/02 | (2006.01) | |
| B32B 27/08 | (2006.01) | |
| B32B 27/30 | (2006.01) | |
| B44C 1/18 | (2006.01) | |
| B29C 65/48 | (2006.01) | |
| A44C 17/04 | (2006.01) | |
| B32B 3/08 | (2006.01) | |
| A44C 27/00 | (2006.01) | |
| B29L 31/00 | (2006.01) | |

(52) U.S. Cl.
CPC ............... *B44C 1/18* (2013.01); *A44C 17/04* (2013.01); *B29C 65/48* (2013.01); *B32B 3/085* (2013.01); *B32B 5/02* (2013.01); *B32B 27/08* (2013.01); *B32B 27/12* (2013.01); *B32B 27/308* (2013.01); *A44C 27/001* (2013.01); *B29L 2031/722* (2013.01); *B32B 2260/046* (2013.01); *B32B 2262/0269* (2013.01); *B32B 2262/10* (2013.01); *B32B 2262/101* (2013.01); *B32B 2262/106* (2013.01); *B32B 2451/00* (2013.01)

(58) Field of Classification Search
None
See application file for complete search history.

(56) References Cited

U.S. PATENT DOCUMENTS

| | | | | | |
|---|---|---|---|---|---|
| 5,273,795 | A | * | 12/1993 | Ullrich ..................... | B44C 5/06 264/328.17 |
| 5,338,591 | A | * | 8/1994 | Poll ......................... | A44C 17/04 428/67 |
| 2006/0086802 | A1 | * | 4/2006 | Tolkowsky ............ | B42D 25/00 235/487 |
| 2010/0154103 | A1 | * | 6/2010 | Swarovski ............. | A41D 27/08 2/244 |
| 2010/0315765 | A1 | * | 12/2010 | Bureau ................... | A44C 17/02 361/679.01 |
| 2015/0207107 | A1 | * | 7/2015 | Schwartz ............ | H01L 51/5281 257/40 |
| 2016/0178916 | A1 | * | 6/2016 | Kakinuma ........... | G02B 27/143 40/546 |

FOREIGN PATENT DOCUMENTS

| | | |
|---|---|---|
| AT | 507 883 | 9/2010 |
| DE | 199 06 844 | 8/1999 |
| DE | 299 08 787 | 9/1999 |
| FR | 1 120 802 | 7/1956 |
| FR | 2 725 882 | 4/1996 |

OTHER PUBLICATIONS

International Search Report dated Jul. 30, 2015 in International (PCT) Application No. PCT/EP2015/059652.
Search Report dated Sep. 25, 2014 in European Application No. 14 00 1564, with English translation.

* cited by examiner

*Primary Examiner* — Sheeba Ahmed
(74) *Attorney, Agent, or Firm* — Stevens & Showalter LLP

(57) ABSTRACT

Decorative composite body containing a plate-like carrier body made of plastics material, and at least one decorative element fixed in the carrier body, wherein the carrier body consists at least regionally of a fibre-reinforced plastics material, and wherein the decorative element is cohesively bonded to melted or at least partially liquefied and resolidified plastics material of the plate-like carrier body, and wherein that side of the carrier body on which the at least one decorative element is arranged, is additionally provided with a film, preferably made of PMMA, and/or with a cover plate, preferably made of PMMA.

17 Claims, 5 Drawing Sheets

COMPOSITE BODY MADE OF FIBRE-COMPOSITE MATERIAL AND A DECORATIVE ELEMENT

Figure 1:
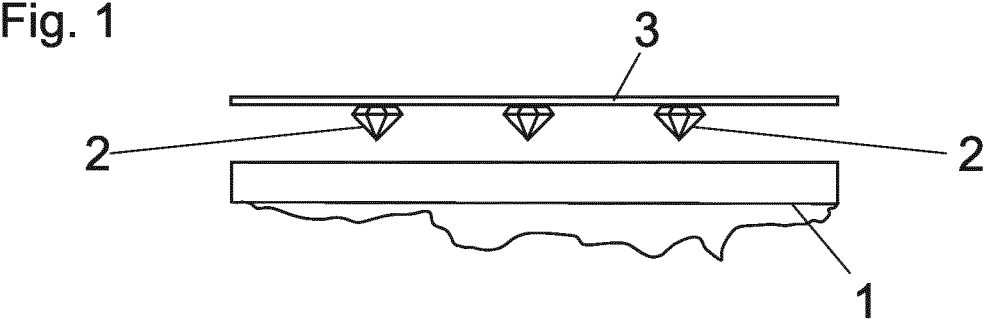

The invention concerns a decorative composite body including a plate-shaped carrier body of plastic and at least one decorative element fixed in the carrier body, wherein the carrier body at least region-wise comprises a fiber-reinforced plastic and wherein the decorative element is joined in substance-to-substance bonded relationship to melted or at least partially liquefied and re-solidified plastic of the plate-shaped carrier body.

Decorative composite bodies including a carrier body having at least one decorative element fixed therein can be made from the most widely varying materials. In particular plastic materials have been found to be advantageous carrier materials as, besides advantageous material properties, they are also easy to shape and can therefore be used in many versatile ways. In comparison with metallic carrier bodies however plastics have disadvantages in regard to the strength of the carrier body.

In order to optimize the material properties of a decorative composite body DE 199 06 844 teaches the use of a carrier of plastic, comprising a fiber-reinforced synthetic resin and a multi-layer surface coating. To arrange gemstones in the carrier, through holes are bored, into which metal inserts or holder sockets are fixed. To anchor the socket in a through hole the intermediate space between the socket and the carrier body is filled with synthetic resin. For fixing the metal inserts once again suitable milled-out configurations are provided in the carrier.

Such a composite body suffers from a number of disadvantages. On the one hand by virtue of the need for the sockets or the metal inserts a particularly high level of manufacturing complication and expenditure is required for the composite body. In addition for many uses of a decorative composite body provided with gemstones, it is disadvantageous if there are through holes in the carrier body, especially as the metal inserts or sockets described in DE 199 06 844 cannot afford sealing integrity in relation to dirt or water passing therethrough. There is also the risk that the gemstones come loose from the metal inserts or the sockets whereby the composite body suffers a serious loss in value.

A piece of jewelry comprising a fiber composite material is disclosed in DE 299 08 787 U1. The use of fiber composite materials in the surface region of the visible side of the piece of jewelry means that the structure of the composite fibers, in particular the mesh structure, weave structure, braid structure or knit structure is visible, whereby a large number of surface patterns can be represented. The fiber composite material extends as far as the outside of the piece of jewelry. Alternatively a lacquer coating can be provided. In one embodiment recesses are provided in the visible side of the gemstone, into which precious metal or precious stone inserts are fitted. In that case the recess is produced during production of the fiber composite body or by bores in the finished fiber composite body. After that the precious metal or precious stone inserts are fitted in place so that this affords a force-fitting join, based on friction, between the insert and the fiber composite body. Such a force-fitting join affords only an inadequate hold for the precious metal or precious stone insert in the fiber composite body.

FR 2 725 882 concerns a method of fixing a gemstone in a ring of plastic, wherein an element is cut out of a block of thermoplastic material. After a heat treatment a gemstone is pressed into a milled recess of small dimensions and acted upon under high pressure until the plastic has cooled. For definitive fixing of the gemstone a further heat treatment is effected, in which a retaining region is produced along the opening of the recess, whereby a form-fitting join is produced for the gemstone.

An object of the present invention is to provide a decorative composite body of the kind described in the opening part of this specification, which has a carrier body with particularly advantageous material properties, wherein the at least one decorative element is to enjoy a particularly stable hold in the carrier body and in addition is to be protected from external effects or environmental influences.

That is achieved by a composite body having the features of claim 1.

The decorative element is selected from a gemstone, preferably provided with facets, which can be a natural or synthetic precious stone or a gemstone of ceramic material or a glass stone, preferably of crystal glass, a metallic decoration object like for example a stamped metal sheet, a wood element like for example a real wood veneer plate, a decorative film or a technical functional element like for example LEDs, sensors, magnetic strips, computer chips and so forth. The carrier body, at least region-wise and in an embodiment also entirely, comprises a fiber-reinforced plastic and serves for the arrangement of a decorative element. The region of the fiber-reinforced plastic affords those advantageous material properties which are afforded by fiber composite materials like for example increased strength, in particular increased tensile strength in the fiber direction, low weight, low thermal expansion, corrosion resistance, high vibration resistance, good formability and so forth.

Production of the composite body is made easier by a carrier body of a plate-shaped configuration. A plate-shaped carrier body presents itself in particular when a plurality of decorative elements are to be arranged in the composite body. In addition composite bodies with plate-shaped carrier bodies can be advantageously used for products with at least partially flat surfaces like for example for mobile telephones, for casings for mobile telephones, credit cards or membership cards.

With a substance-to-substance bonded join to the carrier body of plastic and in particular to melted and re-solidified plastic the disadvantages of the state of the art mentioned in opening part of this specification are overcome and this gives an option which is simple in terms of production technology for joining decorative elements, in particular gemstones or glass stones, to a carrier body of plastic, wherein a particularly stable and intimate fixing of the decorative element in the carrier body is made possible as a consequence of the substance-to-substance bonding join.

That side of the carrier body at which the at least one decorative element is arranged is additionally provided with a film which is translucent or transparent for light of the visible spectrum. The term translucent body in connection with the present invention is used to denote a body which is partially transparent for light of the visible spectrum and as a result has increased opacity in comparison with a transparent body. In that case the partial light transparency can depend on the spectral range so that the translucent body is also designed to be diaphanous in a color different from white. Films based on polymethylmethacrylate (PMMA) are preferred. In addition, during the production process, the film can serve as a transfer film, by means of which the at least one decorative element or also a plurality of decorative elements are held prior to or during the step of fixing to the carrier body. Additionally or alternatively a cover plate which is transparent or translucent for light in the visible spectrum, preferably of PMMA, can be arranged at that side of the carrier body at which the at least one decorative element is arranged, or at the film. That cover plate, like the film, also serves to protect the decorative element and the fiber composite material in the carrier body.

Both the film and also the cover plate preferably comprise plastic, preferably selected from polymethylmethacrylate (PMMA), (for example Plexiglas® from Evonik), cellulose acetate (for example Tenite® 105E1R26029), ionomer EMAA (for example Surlyn® PC2000 from DuPont), thermoplastic elastomer on a silicone basis (for example Geniomer® 200 from Wacker Silicones), thermoplastic polyurethane (for example Elastollan® 695A), cyclo-olefinic copolymer (for example Topas® 5013), amorphous polyamide (for example Grilamid® TR90), and polycarbonate (for example Makrolon® 6555). The above transparent plastics are of high optical quality with a high degree of transmission, a low degree of opacity and a high level of clarity. Particularly if gemstones are used as decorative elements the brilliance effect thereof is maintained in the best possible way if the refractive index of the gemstones and the film or cover plate differ from each other as greatly as possible. Gemstones of crystal glass are advantageous in that respect as they have a high refractive index of between 1.54 and 1.58 while some of the above-mentioned polymer materials have much lower refractive indices like for example Plexiglas® with a refractive index of 1.498, the ionomer Surlyn® with a refractive index of 1.50 or the thermoplastic silicone elastomer Geniomer® with a refractive index of 1.43. It is also possible for the cover plate to be made from glass.

In that respect it has surprisingly turned out that a film or a cover plate of PMMA affords particularly good protection for the decorative element arranged in the carrier body and thus a composite body according to the invention is made available, which gives good results beyond the usual measures in regard to adhesion of the decorative elements and in particular in regard to the corrosion characteristics so that such a composite body protects the embedded decorative elements better and more durably against environmental influences than is the case with decorative elements which are glued into bored holes or cavities. The corrosion aspect is relevant in that respect insofar as the decorative element can include metallic components. In the case of glass stones or gemstones that can be relevant when the surface arranged in the carrier body, to increase brilliance, is provided with a metallic mirror layer or similized.

To demonstrate that improved protection a number of tests have been carried out, wherein a plurality of gemstones ground from crystal glass bearing the designation 1028 Cry F-foil pp14 Chatons have been used as decorative elements in a carbon fiber-reinforced carrier body impregnated with resin and both the side of the carrier body at which the gemstones are arranged and also the opposite side have been joined to a PMMA film, wherein that material composite is produced in accordance with the invention in a common pressing operation. The test bodies were plate-shaped and respectively measured 40 mm×25 mm and each provided with ten gemstones. In the so-called salt spray test (also referred to as the "salt spray mist test") in accordance with DIN EN ISO 9227:2006-10 the samples were sprayed with common salt solution to simulate the situation of a sea water influence or the environmental impact in a large city. In that case the samples were suspended in a corrosion test cabinet (WEISS-KWT 450) and then exposed at 35° C. to a spray mist of 5 wt. % common salt solution. To track the corrosion procedures the samples were removed after 24, 48 and 72 hours, rinsed with deionized water (deionate), dried and visually assessed. It was found in that case that the carrier body had not experienced any optical change while in the case of a carrier body without PMMA film a stained and blotchy appearance has occurred. In particular in the case of the test body with a PMMA covering the gemstones remained completely intact.

Further advantageous configurations of the invention are defined in the appendant claims.

Both thermosets like for example powder lacquers and also thermoplastic materials are preferably suitable as plastic materials for the carrier bodies. In that respect in principle thermoplastic materials like for example polyamides (PA), polycarbonates (PC), polymethylmethacrylates (PMMA) and the like are appropriate.

Thermoplastic materials are plastics which can be reversibly deformed in a given temperature range. The deformation can be repeated as often as may be desired by cooling and re-heating to the molten state. If as a result of heating the thermoplastic material is in a pasty to a molten state then the decorative element can be particularly easily arranged in the carrier body.

In the case of a carrier body comprising a thermosetting starting material, melting or liquefaction to a molten state occurs upon heating. In that case heating causes hardening of the thermosetting starting material as a consequence of chemical cross-linking due to the supply of thermal energy. The carrier body solidifies with the formation of a substance-to-substance bonded join to the decorative element. The solidification corresponds in that case to hardening. Hardening means that fresh bonds are created between the educts of the thermosetting material, preferably a powder lacquer, and there is an irreversible transition from the liquid to the solid state. Thermosetting plastics are preferably suitable according to the invention as they are particularly temperature-stable and the composite body does not deform even at relatively high ambient temperatures.

In comparison therewith the production of the substance-to-substance bonded join of the decorative element to the carrier body in the case of a thermoplastic material occurs due to solidification of the thermoplastic material during cooling after the end of the supply of heat. In contrast to thermosetting systems, when thermoplastic materials are involved, no further bonds are produced but stability is afforded by cooling to a temperature below the solidification temperature. Accordingly the decorative element is joined in substance-to-substance bonded relationship to melted and re-solidified plastic material of the carrier body of thermoplastic material.

The term substance-to-substance bonded join is generally used to denote a join in which the joined components are held together by atomic or molecular forces. In particular adhesive joins are substance-to-substance bonded joins.

It was surprisingly found that the fiber reinforcement makes it possible to produce a particularly stable fixing for the decorative element in the carrier body if the decorative element is joined in the region of the fiber-reinforced plastic to the carrier body.

A quite stable and intimate join is afforded if powder lacquer is used for the fiber-reinforced plastic. The powder lacquers are preferably selected from epoxy powder lacquers (for example Freopox® PE7105), polyester powder lacquers (for example Freiotherm® PP1001), acrylate powder lacquers (for example Freocryl® PY1005), polyurethane powder lacquers (Freiotherm® PU2005) as well as hybrid powder lacquers and mixtures thereof. If the plastic matrix of the fiber-reinforced plastic contains powder lacquers, preferably selected from the listed kinds of powder lacquers, the substance-to-substance bonded join to the decorative element can be produced by melting or liquefaction and hardening of the plastic without any need to have to apply adhesive separately to the surface of the decorative element.

Powder lacquers further have the advantage of being solvent-free and therefore environmentally friendly. In addition powder lacquers in the raw condition of being in powder form can be easily pressed and processed.

Also when using carrier bodies of fiber-reinforced plastic with thermoplastic matrix materials like for example so-called thermoplastic organic sheets (for example Tepex® Optilite from Lanxess, for example complying with the specifications 408-C200(2)-FG490(4)/45% or 108-FG290 (X)/45%), a stable substance-to-substance bonded join to the decorative element is afforded by melting or liquefaction and solidification of the plastic without any need to have to apply adhesive separately to the surface of the decorative element. In addition there is a stable bond between the film or the cover plate and the carrier body.

Overall both thermosets like for example powder lacquers and also thermoplastics have the necessary adhesive properties for the decorative element to be stably held in the carrier body. As the decorative element is joined over its entire surface which is arranged in the carrier body to the carrier body, wherein the plastic material of the carrier body provides for the substance-to-substance bonded join, in principle an extremely stable and intimate join between the decorative element and the carrier body is achieved.

Numerous prepregs can also be used as fiber-reinforced plastics. These involve fiber-reinforced plastic which can be easily handled and which is immediately ready for use and in which the fibers are (pre)-impregnated. The use of solvent-free prepregs is particularly advantageous according to the invention. In comparison with conventional thermosetting prepregs these involve prepregs which are storable even at ambient temperature and can be easily processed.

In particular prepregs with powder lacquer are storable for a particularly long period at ambient temperature wherein when using powder lacquer prepregs it is possible to dispense with a solvent so that the material is physiologically innocuous. It is advantageous in particular that such prepregs are available in the form of rolled goods and can be mechanically easily processed without the addition of solvents. Prepregs as an abbreviation for "preimpregnated materials" are fiber fabric materials impregnated with reactive resin materials. With many possible options in terms of further processing they represent the ideal basis for light and high-strength composite bodies. Depending on the respective powder lacquer used the adhesion properties are very good so that a decorative element fixed in the region of the fiber-reinforced plastic is joined to the carrier body in particularly stable relationship. Initially the prepreg resins are disposed in the reactive B-state involving medium to high viscosity. Further processing without any difficulty is implemented by a supply of energy and simultaneous shaping measures. In that case the low-molecular (still meltable) resins are converted into the high-molecular un-meltable C-state. In the case of a film of PMMA or a cover plate of PMMA this provides that the prepreg is held together with the film particularly securely.

The decorative element, in particular in the form of a gemstone or glass stone, can be joined directly in substance-to-substance bonded relationship to the carrier body, wherein the substance-to-substance bonded join can be afforded with melted or liquefied and re-solidified plastic. In that case the gemstone or glass stone can be for example similized or provided with a mirror layer. When using prepregs with powder lacquer this affords a particularly stable substance-to-substance bonded join between the impregnation resin on a powder lacquer basis and the gemstone or glass stone.

The fibers of the fiber-reinforced plastic can be inter alia carbon fibers, glass fibers, natural fibers and/or aramide fibers. Basalt fibers or natural fibers like for example hemp, flax, jute, sisal, coconut, straw, hay and/or moss fibers are also conceivable. In addition fibers of wood, fabric, paper, cardboard and/or *papyrus* can also serve as reinforcing substances for the plastic. Hybrid fabrics, that is to say a mix of a number of kinds of fiber, can also be used for the invention. Particularly in the case of carbon fibers which are used according to the invention the regions of fiber-reinforced plastic have a high-grade visual effect corresponding to the technical spirit of the age and afford a 3D effect which has a hologram-like effect when the composite body is moved. Various weave structures and weave types for the fibers of the fiber-reinforced plastic region can be provided for that purpose. For example plane-, twill- and atlas weave are possible. Those kinds of weaves can be made up both biaxially and also unidirectionally. Typical surface weights for the fiber-reinforced plastic range are between 30 and 500 g/m$^2$.

If a plurality of decorative elements are fixed in the carrier body they can be arranged in a common region of fiber-reinforced plastic. It can also be provided that there are a plurality of regions of fiber-reinforced plastic, in which one or more decorative elements are respectively arranged.

A decorative element in the form of a gemstone can be a ground, natural or synthetic precious stone or glass stone preferably provided with facets. Glass stones have the advantage in that respect of inexpensive manufacture and in the case of a high-grade crystal glass can be viewed as an optically high-grade substitute for precious stones. It can also be provided that the surface of the gemstone which is arranged in the carrier body is similized or provided with a mirror coating or mirror layer. That mirror coating can be applied for example by means of PVD or CVD.

In the case of gemstones with a girdle which surrounds that region between the upper part and the lower part of the gemstone and in which the gemstone is of its greatest peripheral extent or when there is an edge between the upper part and the lower part, it can be provided that the gemstone is arranged in the carrier body to above the girdle or that edge so that in the final condition the girdle or that edge is embraced clip-like by the carrier body, thereby giving a particularly firm hold. In that respect it can be provided that the gemstone or generally the decorative element is to be arranged in the carrier body only to such an extent that parts thereof project relief-like from the carrier body. It can however also be provided that the outer surface of the gemstone or generally of the decorative element is to terminate flush with the surface of the carrier body or even that the gemstone or the decorative element is to be fixed beneath the outer surface of the carrier body so that cavities remain above the gemstone or the decorative element.

In an embodiment of the invention the film or cover plate to be arranged on the carrier body is printed upon for example with motifs, wherein there is no printing on those regions of the film or the cover plate in which the decorative elements disposed in the carrier body can be seen. Decoration or embellishment is also possible by means of printing in the case of a film or cover plate on the side of the carrier body that is remote from the decorative elements. Processes known in the state of the art like for example digital printing can be used as the printing processes.

In an embodiment of the invention the film or cover plate which preferably comprises PMMA and which is arranged on that side of the carrier body at which the at least one decorative element is arranged is joined to a film of a different elasticity. For example, a film of Surlyn® or Geniomer® is arranged in a lamination bond on a film comprising PMMA. Surlyn® and Geniomer® are of higher elasticity than PMMA films which are rather brittle and inflexible. The composite body according to the invention becomes more elastic and more flexible and is better protected from impact shocks by the bond with a film with a higher level of elasticity, as in the foregoing example Surlyn® and Geniomer®.

The invention further concerns a process for the production of a composite body as described above.

In a first step the plate-shaped carrier body is heated for example in a furnace to a first temperature. The plastic of the plate-shaped carrier body is melted by the heating effect and becomes pasty or partially liquid and can be shaped and rearranged at least to a certain extent. In the case of thermosetting materials hardening occurs in that case. In that respect the carrier body can be heated to a temperature between 90 and 250° C., preferably between 120 and 220° C. and quite preferably between 130 and 180° C.

In a next step the at least one decorative element is pressed to the plate-shaped carrier body, in which case, as a consequence of the pasty or partially liquid state of the plastic, the decorative element is pressed into the plate-shaped carrier body and when that happens the material of the plate-shaped carrier body is locally rearranged or compressed. The pressure with which the decorative element is pressed to the carrier body can be for example around 0.01-1 $kN/cm^2$, preferably 0.02-0.5 $kN/cm^2$ and particularly preferably 0.03-0.2 $kN/cm^2$. Preferably metallic pressing tools with a high level of surface quality are used for pressing the decorative element to the plate-shaped carrier body.

By virtue of the pasty or partially liquid state of the carrier body the plastic matrix can lie against the surface of the decorative element so that in a further step a substance-to-substance bonded join is established between the decorative element and the plate-shaped carrier body. In that way the at least one decorative element can be joined to the plate-shaped carrier body with very few working steps, in which respect it is in particular unnecessary for the decorative element to be separately provided with adhesive as the plastic of the carrier body itself serves as the adhesive. When using thermosetting materials the substance-to-substance bonded join can already be produced by hardening during the heating step. When using thermoplastic materials the substance-to-substance bonded join to the plate-shaped carrier body is formed by solidification as a consequence of the composite body cooling down.

It can be advantageous for the carrier body to be pre-heated prior to heating to the first temperature. For example that pre-heating step can be effected at a pre-heating temperature of around 130° C. and/or last for a period of around an hour.

In a further embodiment of the process according to the invention the carrier body is heated to a temperature above the first temperature during the pressing step. That heating process can be effected for example at a temperature of between 120 and 280° C.

To reduce stresses in the composite body the composite bodies are preferably gradually heated in the process according to the invention and likewise the pressure is gradually increased. Depending on the plastic used the maximum temperature is at between 120° C. and 280° C.

In the cooling operation a substance-to-substance bonded join is established between the decorative element and the melted and re-solidified or hardened plastic of the carrier body. That cooling operation can be effected while maintaining a pressing pressure by cooling being effected while the composite body is still within the pressing tool.

In an embodiment prior to the pressing operation one or more cavities are pre-shaped for the decorative element or elements in the receiving region of the carrier body whereby the step of pressing the decorative elements into the carrier body is facilitated.

In a further embodiment, during the pressing step, the decorative element or elements can be held to a film, thereby giving a particularly simple method of manufacture of a composite body with a film above the decorative element. As a consequence of that pressing operation the film is also joined to the carrier body. In that case the film to be joined to the carrier body is used as a transfer film with which the decorative elements are applied to the carrier body. Alternatively, it is possible to use a transfer film which is separate from that film and which after transfer of the decorative elements to the carrier body is removed from the decorative elements again, whereupon the film to be joined to the carrier body and the carrier body are pressed.

In that case, the film as well as the decorative element can be joined in substance-to-substance bonded relationship to the carrier body, in particular the melted and re-solidified or hardened plastic of the carrier body. Alternatively or additionally the film itself can also be melted and re-solidified and thereby joined fixedly to the carrier body. The film however can also be subsequently arranged on the carrier body with the decorative elements which have already been at least partially pressed in.

In addition it can be provided that the decorative element or elements are simultaneously pressed with a cover plate to the plate-shaped carrier body. That cover plate can be applied as a protective plate like the above-described film directly to the carrier body or directly to that film.

Figure 2:
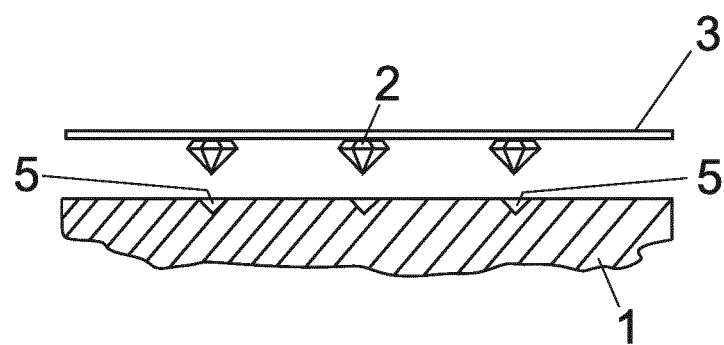
Figure 3:
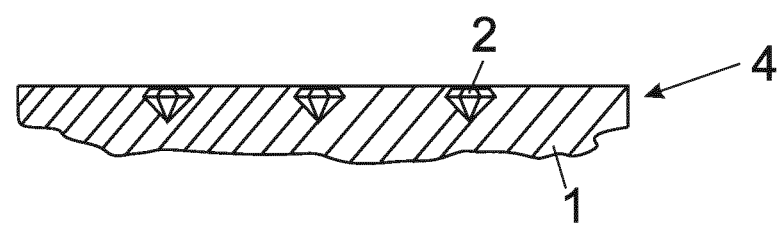
Figure 4A:
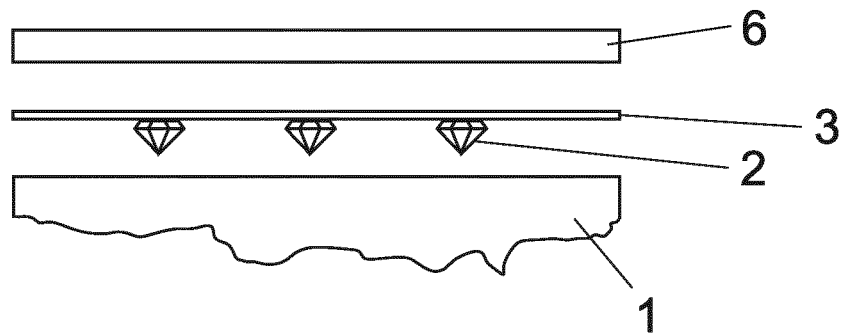
Figure 4B:
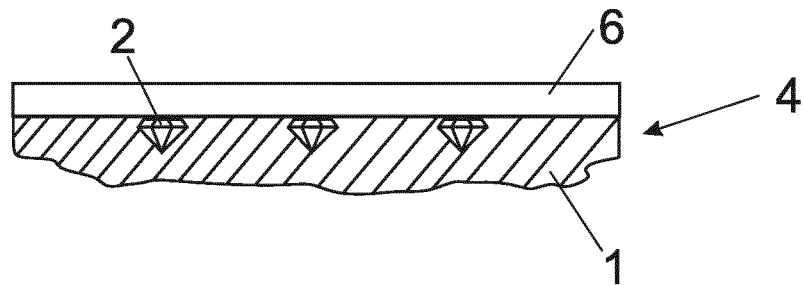

Further details and advantages of the present invention will be described more fully hereinafter by means of the specific description with reference to the drawings in which:

FIG. 1 shows a diagrammatic view relating to the production of a composite body according to the invention, FIG. 2 shows a further diagrammatic view relating to the production of a composite body according to the invention, FIG. 3 shows a cross-sectional view of a composite body according to the invention, FIG. 4*a* shows a further diagrammatic view relating to the production of another embodiment of a composite body according to the invention, FIG. 4*b* shows a cross-sectional view of this embodiment of the composite body according to the invention, and FIG. 5 through 11 show diagrammatic views relating to the production of various embodiments of a composite body according to the invention.

FIG. 1 shows a diagrammatic view relating to the production of a composite body 4 according to the invention with a carrier body 1 comprising fiber-reinforced plastic and in which a plurality of decorative elements 2 in the form of gemstones 2 is arranged. In the present case the overall carrier body is plate-shaped and comprises a fiber-reinforced plastic. The gemstones 2 are moved in relation to the carrier body 1 by means of the film 3 which in this case also serves as a transfer film. The gemstones 2 are pre-fixed on the film 3. After heating of the carrier body the gemstones 2 are pressed to the carrier body 1 and form the composite body 4 according to the invention. For reasons of clarity of the drawing the heating means and pressing tools for the heating and pressing operations which are known per se in the state of the art are not shown in the illustrated Figures or are only diagrammatically illustrated.

After solidification of the molten plastic of the carrier body 1 the gemstones 2 are extremely stable and are intimately joined thereto. In this condition the film 3 consisting for example of PMMA can be removed again. It can however also be provided that the film 3 remains on the composite body 4 for protection purposes or for decorative reasons.

FIG. 2 shows a further view relating to the production of a composite body 4 according to the invention, which differs from FIG. 1 in that cavities 5 have been previously for example shaped in the carrier body 1, the cavities serving to facilitate the operation of pressing in the gemstones 2. While pressing in the gemstones 2 less molten or at least partially liquid plastic material of the carrier body 1 has to be rearranged, which after re-solidification is joined to the gemstones 2 in substance-to-substance bonded relationship.

As can be seen from FIG. 3 showing a cross-sectional view of a composite body 4 produced as shown in FIG. 1 or FIG. 2 the pre-shaped cavities 5 are no longer visible in the finished composite body 4.

FIG. 4a shows a diagrammatic view relating to the production of a further embodiment of a composite body 4 according to the invention. In this case the carrier body 1 is additionally joined to a cover plate 6 of transparent plastic. In the illustrated case firstly the gemstones 2 are pressed to the carrier body 1 by means of a film 3 serving as a transfer film. The film 3 is then pulled off and the cover plate 6 glued to the carrier body 1. For that purpose it is provided that the cover plate 6 is connected to the carrier body 1 in substance-to-substance bonded relationship by melted and re-solidified plastic of the carrier body 1. This embodiment of the composite body 4 according to the invention is shown in the cross-sectional view in FIG. 4b.

Alternatively it can also be provided that the film 3 remains in the composite body 4 and the cover plate 6 is pressed together with the gemstones 2 and the film 3 to the carrier body 1.

The operation of joining the gemstones 2 to the carrier body 1 and the cover plate 6 and possibly to the film 3 can be effected in a single pressing step.

Figure 5:
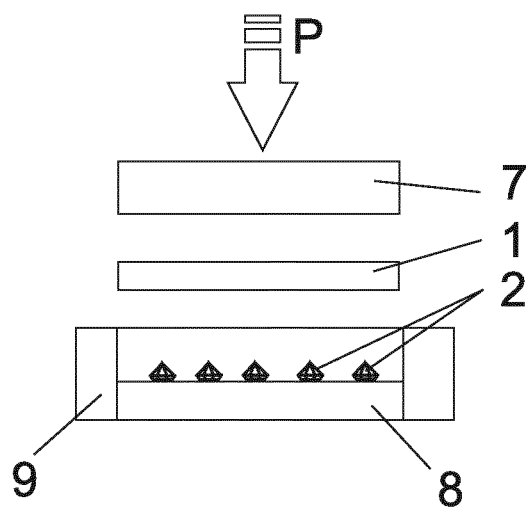

FIG. 5 is a diagrammatic view showing how decorative elements 2 in the form of gemstones 2 are embedded in a carrier body 1 by means of a hot pressing process. In this case the carrier body 1 comprises a fiber-reinforced composite plate or one or more prepreg layers.

Preparation and Process Implementation:

After pre-treatment of the pressing metal mold 7, 8 at all contact surfaces by means of a separating spray the gemstones 2 are laid on the lower die 8 in the desired location and position and the carrier body 1 which is cut to shape on the shaping surface, the carrier body 1 being in the form of a composite plate of prepregs (single-layer or multi-layer) is carefully positioned in the mold 7, 8 and in that procedure placed on the gemstones 2. Thereafter the mold 7, 8 is closed by slowly applying the upper die 7. The closed mold 7, 8 is put into the hot press 9 and heated while still pressure-less to 110° C. When that pre-heating temperature is reached a minimum specific pressing pressure p of 0.05 kN/cm² is applied provisionally so that the gemstones 2 can penetrate into the carrier body 1 which has already become a little plastic, and are thus now pre-fixed for the further process.

Thereafter the mold 7, 8 is further heated to the powder lacquer-specific baking temperature (for example 180° C.) with the pressing pressure p of 0.05 kN/cm² still being applied, for a period of 5-10 minutes. Subsequently the mold 7, 8 is cooled down to about 150° C. and then subjected to a constant pressing pressure p of 0.1 kN/cm². With that pressure setting the tool temperature is further reduced until about 70° C. is reached. The composite body 4 can then be removed from the mold.

Figure 6:
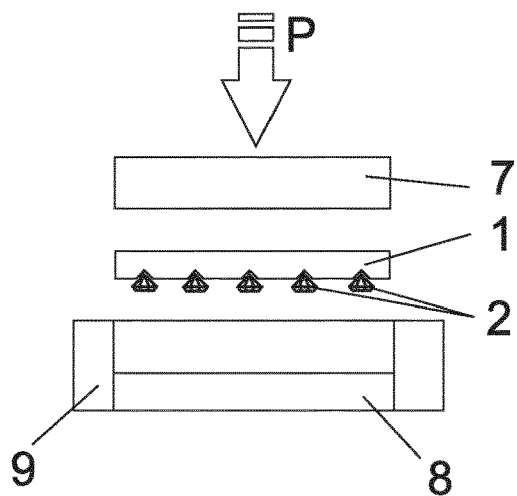

FIG. 6 is a diagrammatic view showing how decorative elements 2 in the form of gemstones 2 are embedded in a carrier body 1 by means of a hot pressing process. In this case the carrier body 1 comprises a fiber-reinforced composite plate or one or more prepreg layers, the carrier body 1 being provided with cavities 5.

Preparation and Process Implementation:

After pre-treatment of the pressing metal mold at all contact surfaces by means of separating spray the gemstones 2 are laid in the plate/prepreg cavities 5 in the desired location and position and the carrier body 1 equipped in that way is carefully transposed into the mold 7, 8. Thereafter the mold 7, 8 is closed by applying the upper die 7. The closed mold 7, 8 is put into the hot press 9 and heated while still pressure-less to 110° C. When that pre-heating temperature is reached a minimum specific pressing pressure p of 0.05 kN/cm² is applied provisionally so that the gemstones 2 can penetrate still more into the carrier body 1 which has already become a little plastic and are thus fixed for the further process.

Thereafter further heating of the mold 7, 8 to the powder lacquer-specific baking temperature (for example 180° C.) is effected with the pressing pressure p of 0.05 kN/cm² still being applied, for a period of 5-10 minutes. Subsequently the mold 7, 8 is cooled down to about 150° C. and then subjected to a constant pressing pressure p of 0.1 kN/cm². With that pressure setting the tool temperature is further reduced until about 70° C. is reached. The composite body 4 can then be removed from the mold.

In the case of a carrier body 1 comprising a thermoplastic organic sheet the mold 7, 8 is heated to the specific softening temperature of for example 165° C. for the respective thermoplastic material, with an increase in pressure to a pressing pressure p of 0.5 kN/cm² for a period of between five and ten minutes. Subsequently the mold 7, 8 is cooled down to about 120° C. and subjected to a constant pressing pressure p of 0.5 kN/cm². With that pressure setting the tool temperature is further reduced until about 70° C. is reached. The composite body 4 with thermoplastic carrier body 1 can then be removed from the mold.

Figure 7:
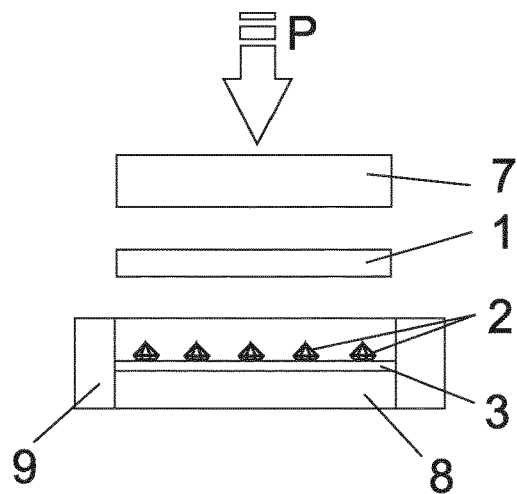

FIG. 7 shows a diagrammatic view of another kind of embedding of decorative elements 2 in the form of gemstones 2 in a carrier body 1 by means of a hot pressing process. In this case the carrier body 1 consists of a fiber-reinforced composite plate or one or more prepreg layers, the gemstones 2 being fixed on a film 3.

Preparation and Process Implementation:

After pre-treatment of the pressing metal mold 7, 8 at all contact surfaces by means of separating spray the film 3 with the pre-fixed gemstones 2 is positioned in the mold 7, 8 on the lower die 8. Fixing of the gemstones 2 on the film 3 can be effected by means of an adhesive layer or a lacquer layer. Alternatively, instead of the film 3, it is also possible to use a cover plate 6. The film 3 or the cover plate 6 which is to be integrated into the component is intended to be distinguished by high transparency and optical quality for the purposes of overall appearance.

The carrier body 1 which is cut to shape on the shaping surface, the carrier body 1 being in the form of a composite plate of prepregs (single-layer or multi-layer), is carefully placed in the mold 7, 8 on the gemstones 2 and the mold 7, 8 is closed by applying the upper die 7. The closed mold 7, 8 is put into the hot press 9 and while still pressure-less heated to 110° C. When that pre-heating temperature is reached a minimum specific pressing pressure p of 0.05 kN/cm² is applied provisionally so that the gemstones 2 can penetrate still more into the carrier body 1 which has already become a little plastic and are thus fixed for the further process. In the case of a thermoplastic carrier body 1 the closed mold 7, 8 is heated pressure-less to 125° C. in the hot press 9.

That is followed by further heating of the mold to the powder lacquer-specific baking temperature (for example 180° C.) with the pressing pressure p of 0.05 kN/cm² still being applied, for a period of 5-10 minutes. Subsequently the mold 7, 8 is cooled down to about 150° C. and then subjected to a constant pressing pressure p of 0.1 kN/cm². With that pressure setting the tool temperature is further reduced until about 70° C. is reached. The composite body 4 can then be removed from the mold. After that production step the film 3 can either be pulled off or it remains on the carrier body 1.

In the case of a thermoplastic carrier body 1, for example a thermoplastic organic sheet, further heating of the mold 7, 8 is effected to the softening temperature of for example 180° C. that is specific to the respective thermoplastic material, with an increased pressing pressure p of 0.4 kN/cm², for a period of between five and ten minutes. Subsequently the mold 7, 8 is cooled down to about 120° C. and then subjected to a constant pressing pressure p of 0.4 kN/cm². With that pressure setting the tool temperature is further reduced until about 70° C. is reached. The composite body 4 can then be removed from the mold, in which case the film 3 is joined to or integrated into the thermoplastic carrier body 1 as a consequence of the pressing operation.

Figure 8:
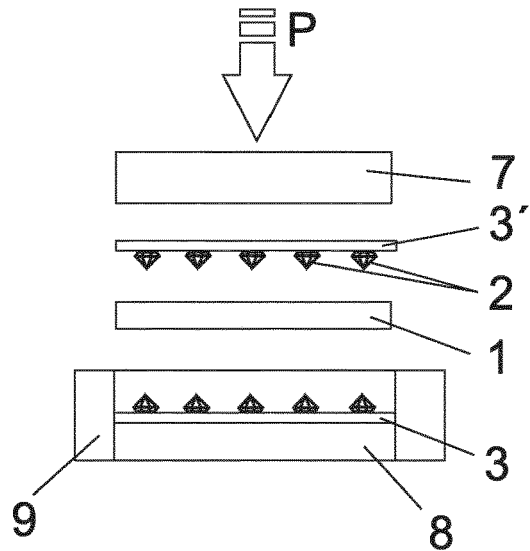

As a more developed variant the structure of the layers to be pressed, by virtue of possible later distortion problems in the component, is implemented symmetrically:

FIG. 8 shows a diagrammatic view of a process in which gemstones 2 are arranged symmetrically on mutually opposite sides of a plate-shaped carrier body 1. In this case gemstones 2 are fixed on two films 3, 3'. While the film 3 is placed on the lower die 8 as in the example of FIG. 7 the film 3' is fixed on the upper die 7. Then—as in the previous examples—the carrier body 1 is placed in the mold 7, 8 whereupon the mold 7, 8 is closed by applying the upper die 7.

In the following embodiments of the invention the decorative elements 2 in the form of gemstones 2 are not arranged in the fiber-reinforced region 10 of the carrier body 1, in contrast to the above-described embodiments.

Figure 9:
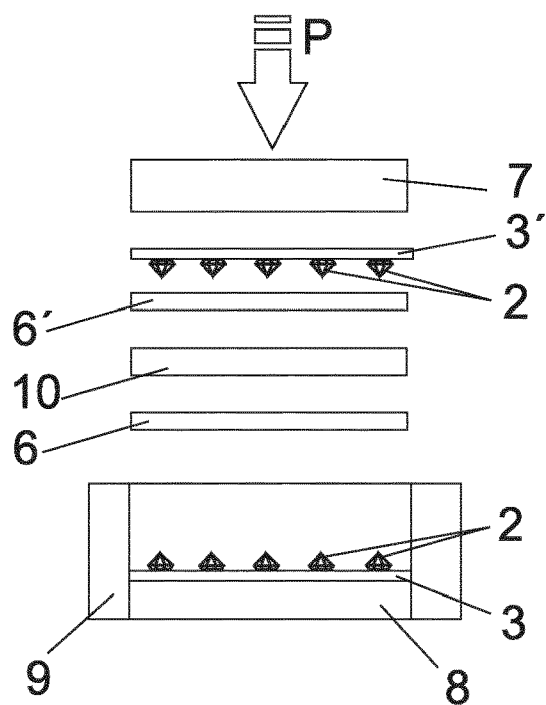

The diagrammatic view in FIG. 9 shows a production process in which a fiber-reinforced composite plate 10 or one or more prepreg layers are joined to two cover plates 6, 6' of PMMA to constitute a carrier body 1. Instead of the cover plates 6, 6' one or more layers of plastic films can also be assembled to the region 10 of fiber-reinforced plastic to constitute the carrier body 1. The operation of joining the cover plates 6, 6' to the region 10 can be effected in the same pressing step in which the gemstones 2 are joined to the carrier body 1. In that case the cover plates 6, 6' are joined in substance-to-substance bonded relationship to molten and re-solidified plastic of the region 10.

Preparation and Process Implementation:

After pre-treatment of the pressing metal mold 7, 8 at all contact surfaces by means of separating spray the films 3, 3' with the pre-fixed gemstones 2 are placed in the mold 7, 8 on the lower die 8 and the upper die 7 respectively. All carrier elements like films 3, 3' and plates 6, 6' which are integrated in the composite body 4 are to be distinguished by high transparency and optical quality for the purposes of the overall appearance.

The films 3, 3' and plates 6, 6' which are cut to shape on the shaping surface as well as the region 10 of fiber-reinforced plastic are carefully placed in the mold 7, 8 in the desired symmetrical sandwich laminate structure, and the mold is closed by applying the upper die 7. The closed mold 7, 8 is put into the hot press 9 and while still pressure-less heated to 90-110° C. When that pre-heating temperature range is reached a minimum specific pressing pressure p of 0.05 kN/cm² is applied provisionally so that the gemstones 2 can penetrate still more into the cover plates 6, 6' which have already become a little plastic and are thus fixed for the further process.

That is followed by further heating of the mold 7, 8 to the powder lacquer-specific baking temperature (for example 160° C.) with the pressing pressure p of 0.05 kN/cm² still being applied, for a period of 5-10 minutes. Subsequently the mold is cooled down to about 130° C. and then subjected to a constant pressing pressure p of about 0.4 kN/cm². With that pressure setting the tool temperature is further reduced until about 70° is reached. The composite body 4 can then be removed from the mold.

As a more developed variant the provision of the layers to be pressed can also be effected with intermediate layers of printed paper or decorative films.

Figure 10:
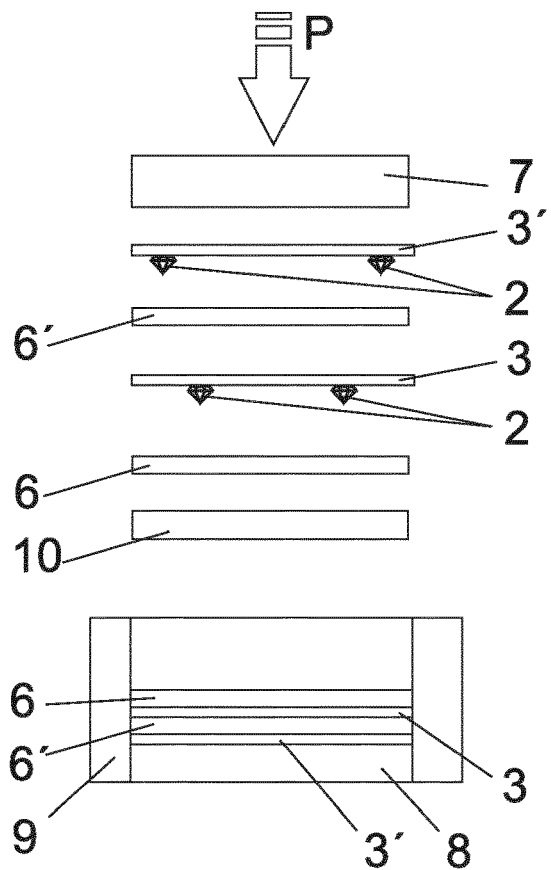

The diagrammatic view in FIG. 10 concerns production of a further embodiment of a composite body 4 according to the invention. In this case the carrier body 1 comprises a region 10 with fiber-reinforced plastic in the form of a composite plate or one or more prepreg layers. In the pressing operation that region 10 is joined to two cover plates 6 of PMMA. A respective film 3 with gemstones 2 fixed thereto is pressed to the outsides of the cover plates 6. A respective further cover plate 6' of PMMA is pressed to the outsides of the films 3. A respective further film 3' with gemstones 2 fixed thereon is pressed to the outsides of the further cover plates 6'. In the case of the films 3, 3' arranged on the lower die 8 the gemstones 2 are not shown for the sake of clarity. All those layers are pressed together in the hot press 9, a substance-to-substance bonded join between those components being produced as a result of the pressing pressure p and the heating effect. The cover plates 6, 6' and the films 3, 3' are transparent so that the gemstones 2 are visible.

In the embodiments shown in FIGS. 8, 9 and 10 a carrier body 1 of fiber-reinforced thermoplastic material, for example a thermoplastic organic sheet, can equally be used, similar parameters to those described in FIG. 7 being employed.

Figure 11:
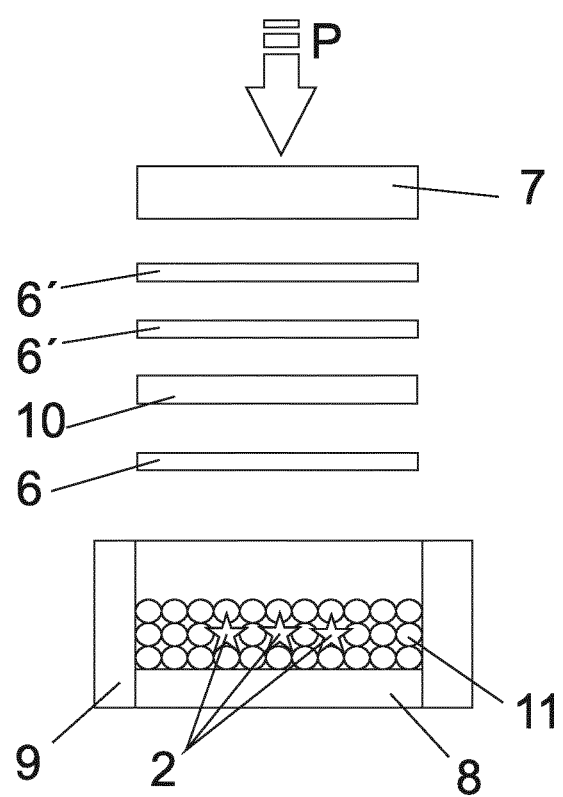

FIG. 11 diagrammatically shows a production process for a further embodiment of a composite body 4 according to the invention, wherein decorative elements 2, for example gemstones 2 ground with facets, are joined by means of a hot pressing process to a carrier body 1 of plastic which at least region-wise comprises fiber-reinforced plastic.

In this case the decorative elements 2 with a transparent plastic granular material 11 preferably comprising PMMA are placed in an ordered or pre-fixed fashion in a mold which in turn is arranged on the lower die 8 of the pressing tool. A region 10 of fiber-reinforced plastic, for example a composite plate or one or more prepreg layers, is joined to a respective cover plate 6, 6' of PMMA on both sides during the pressing operation. Alternatively strong films can also be used instead of the cover plates 6, 6'. A plurality of plates 6' can also be used on the side of the region 10, that is opposite to the plastic granular material 11, in order to permit symmetry adjustment in relation to the region with the decorative elements 2.

The granular material 11 is for example about 3 mm long and is of a diameter of about 4 mm and originates from conventional plastic injection molding and extrusion processing. The processing temperature is between 220 and 260° C. The granular material 11 is processed with a hot press 9. Decorative elements 2 can be mixed in a corresponding amount of PMMA granular material 11 on the one hand and distributed in optimum fashion floatingly in the pressing tool (case 1). Alternatively positioning with the above-described carrier films 3 and fixing aids in a pressing mold on the die is possible, whereupon the pressing tool is filled with PMMA granular material 11 (case 2). A temperature of 200-230° C. in conjunction with a specific pressing pressure p of about 1 kN/cm$^2$ is required for processing of the PMMA granular material 11 in order to avoid grain boundaries of the melted granular material in the composite body.

In that respect it is found that not just gemstones 2 but also more filigree elements as far as decorative elements of organic origin like for example moss or dried bloods can be embedded very substantially without damage in a pressing process with PMMA granular material 11 and an effective depth effect is produced in the finished composite body 4.

Instead of PMMA granular material 11 it is also possible to use very fine PMMA powder, for example of a grain size of between 0.4 mm and 0.6 mm, for the above-described process, in which case such a very fine powder has advantages by virtue of a shorter processing time and thus permits shorter cycle times. In addition using very fine powder involves better wetting of dense structures without air bubble inclusions, which is beneficial to the visual aspect of the finished composite body 4.

Process Implementation:

After pre-treatment of the pressing metal mold 7, 8 at all contact surfaces by means of separating spray in case 1 a mixture of PMMA granular material 11 and optionally homogeneously distributed decorative elements 2 are introduced into the open mold 7, 8 and the upper die 7 applied to close the mold 7, 8.

In case 2 the elements 2 or the carrier film 3 provided with the decorative elements 2 are densely applied to the tool mold surface and the open mold 7, 8 is filled with PMMA granular material 11 whereupon the upper die 7 is applied to close the mold 7, 8.

In both cases the closed mold 7, 8 is firstly heated while still pressure-less in the press 9 to about 90-110° C. When that pre-heating temperature is reached a minimum pressure p of 0.05 kN/cm$^2$ is set. That is followed by further heating of the mold 7, 8 under that pressure to about 200-230° C. When the maximum temperature is reached the mold 7, 8 is cooled at 0.05 kN/cm$^2$ to 130° C., and from that cooling temperature, under a main pressure of 1 kN/cm$^2$, the procedure is continued down to the mold removal temperature of about 90-70° C. The application of pressure is stopped and the composite body 4 can be removed from the mold in hand-hot condition.

The invention claimed is:

1. A decorative composite body including a plate-shaped carrier body of plastic and at least one decorative element fixed in the carrier body, wherein the carrier body entirely consists of a fiber-reinforced plastic and wherein the decorative element is joined directly in substance-to-substance bonded relationship to melted or at least partially liquefied and re-solidified fiber-reinforced plastic of the plate-shaped carrier body, wherein the side of the carrier body at which the at least one decorative element is arranged is additionally provided with a film and/or with a cover plate.

2. The composite body as set forth in claim 1, wherein the plastic is selected from a group of thermosets, or from a group of thermoplastics.

3. The composite body as set forth in claim 1, wherein the fibers are selected from a group consisting of: carbon fibers, glass fibers, aramide fibers, basalt fibers, natural fibers and combinations thereof.

4. The composite body as set forth in claim 1, wherein the at least one decorative element is a gemstone which is in the form of a natural or synthetic precious stone, or in the form of a glass stone, and/or is a metallic decoration object, a wood element, a decorative film or a technical functional element.

5. A process for producing the decorative composite body as set forth in claim 1, said method comprising:
   i. heating the plate-shaped carrier body to a first temperature,
   ii. pressing the at least one decorative element with the plate-shaped carrier body, and
   iii. establishing a substance-to-substance bonded join between the decorative element and the plate-shaped carrier body.

6. The process as set forth in claim 5, wherein the carrier body is heated to a temperature above the first temperature during the pressing operation.

7. The process as set forth in claim 5, wherein the first temperature is 90° C.-250° C., preferably 120° C. 220° C. and quite preferably 130° 180° C., and the pressing operation is performed at a pressure of 0.01-1 kN/cm$^2$, preferably 0.02-0.5 kN/cm$^2$ and quite preferably 0.03-0.2 kN/cm$^2$.

8. The process as set forth in claim 5, wherein a cavity is pre-shaped for the decorative element prior to the operation of pressing the at least one decorative element with the carrier body.

9. The process as set forth in claim 5, wherein the at least one decorative element is held by a film during the pressing operation.

10. The process as set forth in claim 5, wherein cooling of the composite body is effected while maintaining a pressing pressure.

11. The process as set forth in claim 5, wherein the at least one decorative element is pressed to the plate-shaped carrier body simultaneously with a cover plate, preferably of PMMA.

12. The process as set forth in claim 5, wherein the at least one decorative element is pressed to the plate-shaped carrier body simultaneously with a film, preferably of PMMA.

13. The process as set forth in claim 5, wherein the at least one decorative element is put into a plastic granular material or plastic powder, wherein the decorative element put into the plastic granular material or plastic powder is pressed to the plate-shaped carrier body in accordance with step.

14. The decorative composite body of claim 1, wherein the film and/or the cover plate is/are made of PMMA.

15. The decorative composite body of claim 2, wherein the fiber-reinforced plastic is in the form of a powder lacquer.

16. The decorative composite body of claim 4, wherein the at least one decorative element is provided with facets.

17. The decorative composite body of claim 4, wherein the at least one decorative element is in the form of a crystal glass stone.

\* \* \* \* \*